UNITED STATES PATENT OFFICE.

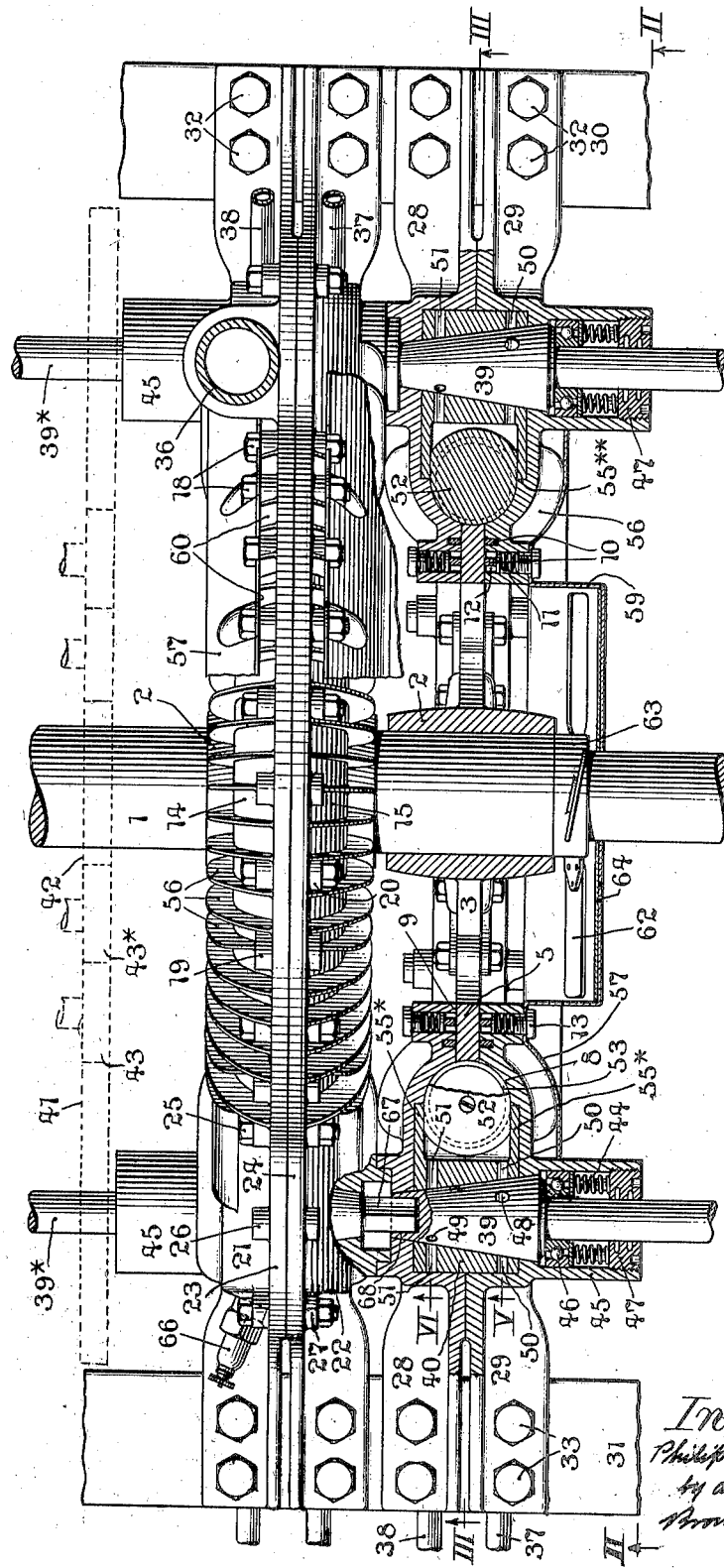

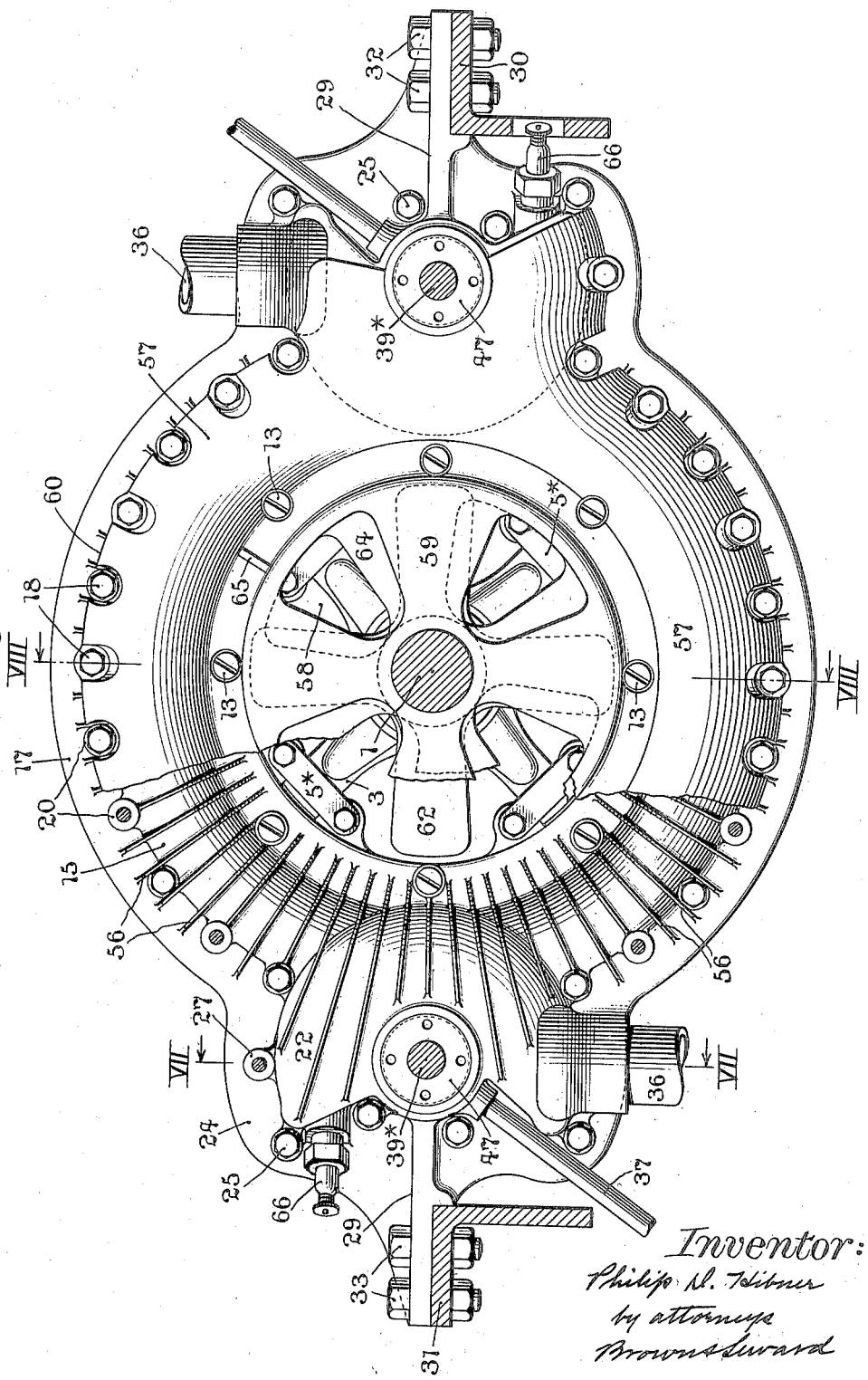

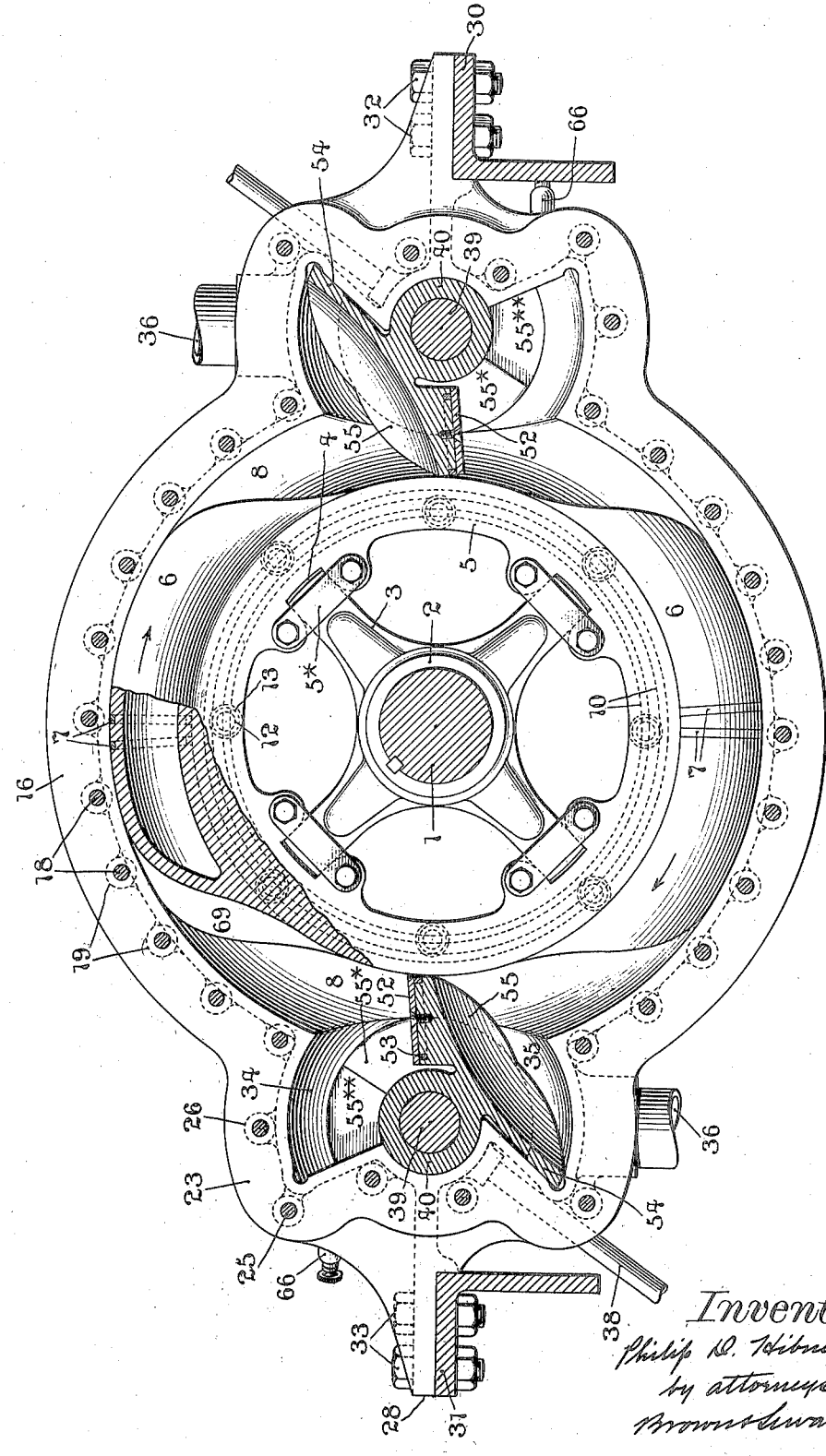

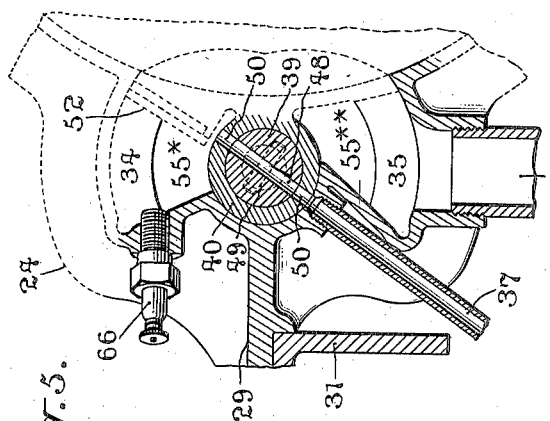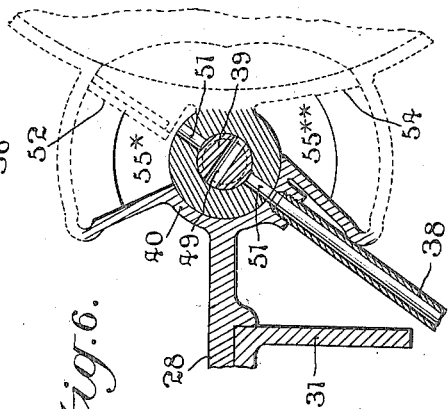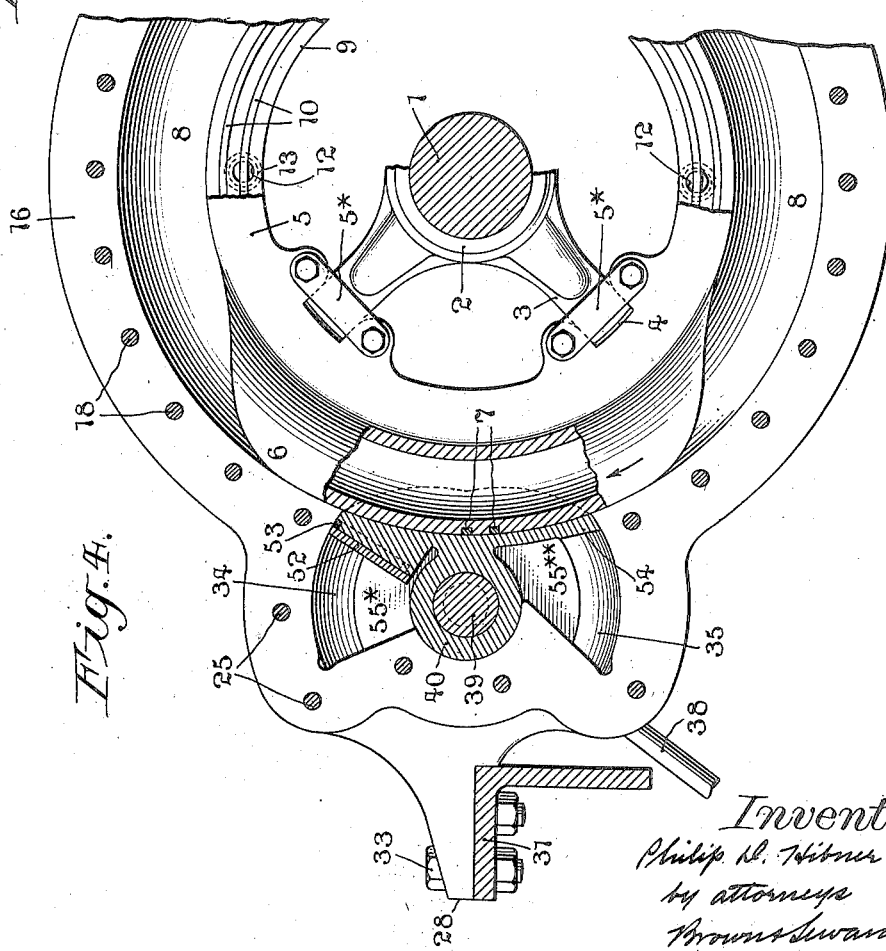

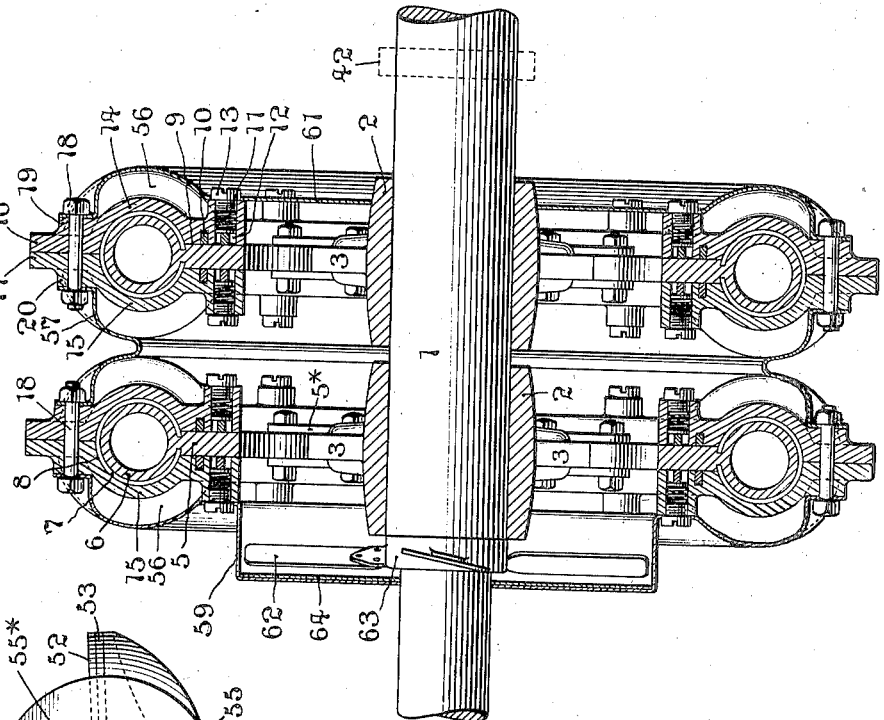
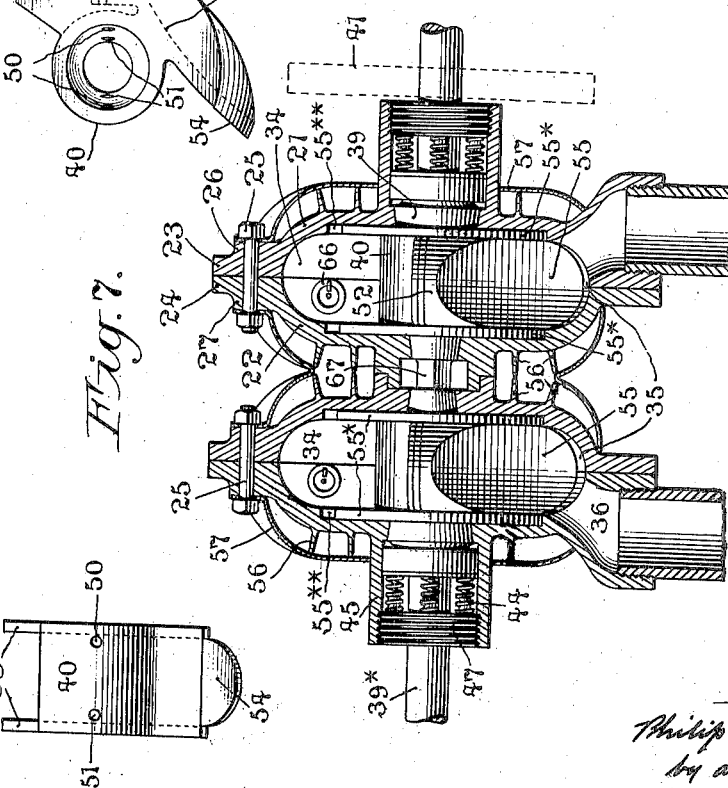
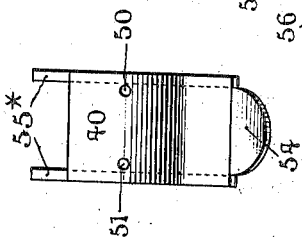

PHILIP D. HIBNER, OF SEATTLE, WASHINGTON.

ROTARY ENGINE.

1,345,773.   Specification of Letters Patent.   Patented July 6, 1920.

Application filed March 11, 1919. Serial No. 281,953.

*To all whom it may concern:*

Be it known that I, PHILIP D. HIBNER, a citizen of the United States, and resident of the city of Seattle, county of King, and State of Washington, have invented a new and useful Improvement in Rotary Engines, of which the following is a specification.

The object of my invention is to provide a rotary engine which will be very efficient and which will furnish increased power for predetermined weight, the moving parts being effectively packed to prevent leakage of the motive fluid and the parts being so arranged as to be very accessible for examination and renewal.

A further object is to provide a rotary engine which may be effectively cooled.

My invention more particularly includes improvements in the valve mechanism, the piston and the casing as will be hereinafter fully set forth.

A practical embodiment of my invention is represented in the accompanying drawings in which the invention is shown as applied to a rotary engine of the internal combustion type having means for scavenging the engine after each firing stroke.

Figure 1 represents one unit of the engine in horizontal central section and the adjoining unit in top plan, a portion of the air cooling jacket being broken away to more clearly illustrate the parts beneath the same.

Fig. 2 is a section taken in the plane of the line II—II of Fig. 1, a portion of the air cooling jacket being broken away.

Fig. 3 is a section taken in the plane of the line III—III of Fig. 1, a portion of one of the piston heads being broken away to illustrate the interior construction thereon.

Fig. 4 is a detail section in the same plane as Fig. 3 with the moving parts in another position.

Fig. 5 is a detail section taken in the plane of the line V of Fig. 1, with the rotating and oscillating valves in the positions shown in Fig. 4.

Fig. 6 is a section taken in the plane of the line VI of Fig. 1 with the rotating and oscillating valves in the positions shown in Fig. 4.

Fig. 7 is a section taken in the plane of the line VII—VII of Fig. 2.

Fig. 8 is a section taken in the plane of the line VIII—VIII of Fig. 2.

Figs. 9 and 10 are face and end views respectively of one of the oscillating valves.

The rotary shaft 1 of the engine has fixed thereto the hub 2 of the piston, which hub has spokes 3, the ends of which are located in sockets 4 in the rim member 5 of the piston; straps 5 on opposite sides of the spokes serving to so interlock the spokes to the rim member to permit a compensating movement for unequal heat expansion and contraction in the inner and outer members of the piston. The rim member 5 of the piston is provided with one or more, in the present intsance two heads 6 diametrically opposed, which heads are circular in cross section and are preferably hollow. One or more packing rings 7 of the usual type encircle the piston heads.

An annular casing surrounds the piston shaft 1, within which casing is formed an annular piston chamber 8 concentric with the shaft 1, within which chamber, the piston heads 6 travel. This annular piston chamber 8 has a continuous slot 9 through the inner wall of the annular casing, within which slot the rim member 5 of the piston travels. One or more packing rings 10 in the present instance, two concentric packing rings project through the sides of the slot 9 into engagement with the opposite faces of the rim member 5 of the piston. The inner packing rings 10 may be yieldingly pressed against the rim member 5 to compensate for wear. An annular series of springs 11 are set in sockets 12. Screws 13 are used in the present instance, for this purpose.

The annular casing is herein shown as formed of two circular half sections 14, 15 having exterior flanges 16, 17 secured together by an annular series of bolts 18 passing through alined lugs 19 and 20 on said flanges.

One or more, in the present instance two, valve chests are provided for each annular piston chamber, said valve chests being formed by extensions 21, 22 formed integral with the half sections 14 and 15 of the casing, said half section extensions 21 and 22 of the valve chest having exterior flanges 23, 24 secured together by bolts 25 which pass through alined lugs 26, 27 on said flanges.

Bracket extensions 28 and 29 are formed integral with the half sections 21, 22 of each valve chest, which extensions are designed to be supported upon the longitudinal beams 30, 31 of the engine supporting frame and to be secured to said beams by the bolts 32, 33.

Each valve chest has an inlet chamber 34 and an exhaust chamber 35, which exhaust chamber is provided with an exhaust passage 36 located entirely in one of the half sections of the valve chest in the present instance, the half section 21 of one unit and the half section 22 of the next adjoining unit.

One or more, in the present instance two, motive fluid supply passages 37, 38 lead to each valve chest, the passage 37 being intended to supply compressed combustible gas and the passage 38 being intended to supply compressed air.

Novel means are employed to alternately open the passages 37, 38 to the inlet chamber 34 and to simultaneously open or close the inlet and exhaust chambers 34, 35 to the piston chamber 8, which means comprises coaxial rotating and oscillating valves 39, 40, located in the valve chest. The valve 39 may be driven from the shaft 1, in the opposite direction, as for instance, one revolution of the valve to two revolutions of the shaft, through a train of gears 41, 42, 43, 43* indicated in dotted lines in Fig. 1, the gear 41 being fixed to the shaft 39* of the valve, the gear 42 being fixed to the rotary shaft 1 and the gears 43, 43* being idler gears. The body of the rotating valve 39 is tapered and it is seated at its opposite ends in the side walls of the valve chest. Spring means 44 are located in a lateral extension 45 of the valve chest in position to yieldingly hold the rotating valve in its seats. This spring means as shown in the present instance is adjustable and is located between a ball bearing 46 and an adjusting screw 47 threaded into the extension 45.

This rotating valve 39 is provided with through ports 48, 49 arranged at right angles to each other in different transverse planes, the through port 48 being located in the plane of the combustible gas supply passage 37 and the through port 49 being located in the plane of the compressed air supply passage 38.

The valve 40 is fitted to oscillate freely on the tapered body of the rotating valve 39 which oscillating valve is provided with two pairs of alined ports 50, 50, 51, 51. The ports 50, 50 are arranged to be brought into and out of alinement with the through port 48 in the operation of the valves to open and close communication between the combustible gas supply passage 37 and the inlet chamber 34.

The ports 51, 51 are arranged to be brought into and out of alinement with the through port 49 in the operation of the valves to open and close communication between the compressed air supply passage 38 and the inlet chamber 34.

The oscillating valve 40 is provided with a piston head 52 which works in the inlet and piston chambers 34 and 8, and which is arranged to close communication between the inlet chamber 34 and the piston chamber 8 when the valve is at the limit of its movement in one direction and to open communication between these two chambers when the valve is at the limit of its movement in the other direction. This valve piston head 52 is provided with an encircling packing ring 53 for preventing the escape of the fluid past the same when the valve is in either of its positions with the valve piston head located in the inlet chamber 34 or in the piston chamber 8.

This oscillating valve is further provided with an extension 54 which fits the exhaust chamber 35 and which is arranged when the valve is in position to open the inlet chamber 34 to the piston chamber 8, to also open the piston chamber 8 to the exhaust chamber 35.

When the valve is in position to close the inlet chamber 34 to the piston chamber 8, the extension 54 will also close the piston chamber 8 to the exhaust chamber 35.

The oscillating valve is provided with a curved face 55, which will, when the oscillating valve is closed, form a continuation of the wall of the piston chamber 8 to permit a free passage of the piston heads 6, and their piston rings past the mouths of the inlet chamber 34 and exhaust chamber 35.

The oscillating valve is also provided with side plates 55* which travel in circular guide grooves 55** in the side walls of the valve chest.

The opening movement of the oscillating valve is limited by the engagement of the extension 54 with the end wall of the exhaust chamber 35 thus preventing the piston head 52 from being forced beyond its position transverse to the piston chamber 8.

Novel means are employed for air cooling the engine which means is constructed, arranged and operated as follows:—

The annular casing and the valve chests are provided with heat radiating flanges 56. A jacket 57 incloses the casing and portions of the valve chests which jacket is formed of several members and is provided with a centrally arranged intake 58 located in an extension 59 of the jacket around the shaft 1. A peripheral outlet 60 for this jacket is provided for by spacing the peripheries of the jacket members from the flanges 16 and 17 of the casing half sections, and from the flanges 23, 24 of the valve chest half sections, these jacket peripheries being secured to the annular series of lugs 19, 20 and the annular series of lugs 26, 27 by the bolts 18 and 25 respectively.

Where two units are employed as shown in the accompanying drawings, the jacket comprises an intermediate member and two outside members, one outside member bearing the extension 59 and the other outside member being extended inwardly into close proximity to the hub 2 of the rotary piston as shown at 61.

A suction fan 62 has its hub 63 secured to the shaft 1 immediately in back of the end wall of the extension 59 of the jacket which fan will draw the air in through the intake 58 and force it past the cooling flanges 56 outwardly through the peripheral outlet 60.

To regulate the amount of air being forced past the engine casing to suit different requirements I provide the intake 58 with a suitable damper 64 which may be readily manipulated by the handle 65.

A spark plug 66 has its electrodes located within the inlet chamber 34 of each valve chest.

Where several units are employed, the alined rotating valves 39 are suitably interlocked. Where two units are shown as in the accompanying drawings, the interlocking of the two adjacent rotating valves may be accomplished by providing one valve with a stem 67 which enters and interlocks in a recess 68 in the inner end of an adjacent valve. This arrangement permits both valves to be yieldingly held in their seats to take up all wear.

I preferably taper off and concave the front and back ends of each of the rotary piston heads 6 as shown at 69 so that these ends will very closely fit the surfaces of the oscillating valves as the piston heads pass into and out of engagement therewith.

When the engine is used as an internal combustion engine in connection with separate combustible gas and compressed air supply passages, the cycle of operations is as follows:—

Presupposing the parts to be in the positions shown in Fig. 3 with the piston rotating in the direction indicated by the arrows, the combustible gas has been supplied to the inlet chambers 34 by the coaction of the rotating and oscillating valves, the charges have been fired and the oscillating valves have been moved into the positions shown by the passage of the piston heads and the expansion of the combusted gases is driving the piston. The heads 52 of the oscillating valves form abutments across the piston chamber 8 and the packing rings 53 preventing the leakage of the gas past the said heads. It will be seen also that the spaces in front of the piston heads are open to the exhaust chambers 35 to permit the escape of the previous charge of compressed air which had been used for scavenging and cooling purposes.

As the piston heads approach the positions shown in Fig. 4 the front ends of the piston heads will engage the oscillating valves and rock them into the positions shown in Fig. 4 where the inlet chambers and exhaust chambers will be closed and the curved faces 55 of the oscillating valves will form unbroken or interrupted continuations of the walls of the piston chamber to permit the smooth passage of the piston heads and their packing rings across the mouths of the said inlet and exhaust chambers.

In the meantime the rotating valves have moved into positions to bring the compressed air supply passages into open communication with their respective inlet chambers, through the ports in the oscillating valves, so that as the piston heads pass the oscillating valves, the valves will open and the spaces back of the pistons will be supplied with compressed air for scavenging and cooling purposes. The spaces in front of the pistons will be open to the exhaust chambers to permit the escape of the combusted gases before the next scavenging operation.

The engine may be still further cooled by the forcing of the air through the air cooling jacket as previously described.

While I have shown this engine as a rotary internal combustion engine, it is understood that I wish to cover the novel features for use in rotary engines of various types wherever applicable.

The engine may be made up of one or more units and each piston chamber may have one or more valve chests and piston heads to suit different requirements.

In certain aspects of my invention it would not be necessary to use the scavenging operation and this may be omitted if so desired.

It will be seen from the above description that I have provided an engine in which the parts subjected to wear and liable to leakage may be readily and effectively packed.

It will also be seen that I have provided novel means for keeping the working temperatures down to the most efficient point.

Where the compressed air supply is used for scavenging and cooling purposes this supply may also be used if desired for starting the engine. Also where this compressed air supply is used it will be seen that the piston chamber is filled with a fluid which will add to the efficiency of the firing stroke, the air within the annular chamber combining much more readily with the charge of combustible gas than where the chamber has not been scavenged by the compressed air.

Another valuable feature is the shaping of the oscillating valve to form when closed an unbroken continuation of the walls of the piston chamber.

In the arrangement of the parts as shown in the accompanying drawings the charge within the inlet chamber is subjected to an extra compression as the head of the oscillating valve is forced inwardly a short distance from the mouth of the chamber by the passage of the piston head, as clearly seen in Fig. 4.

Another very important feature of the invention is the compensated interlocked connection between the inner and outer members of the rotary piston.

By rotating the valve 39 in the opposite direction to the shaft 1, the opening and closing of the ports in the valves 39 and 40 is accomplished as the valves are moving in opposite directions, and a very quick opening and closing of the ports is accomplished.

What I claim is:—

1. In a rotary engine, a casing having an annular chamber, a piston head traveling therein and coaxial rotating and oscillating valves for controlling the admission of motive fluid to said chamber, the rotating valve being driven from the engine shaft and the oscillating valve being controlled in its movements by the piston head.

2. In a rotary engine, means for supplying combustible gas and compressed air, a casing having an annular chamber, one or more piston heads traveling therein and one or more pairs of coaxial valves operated by the engine for controlling the admission of combustible gas and compressed air to said chamber.

3. In a rotary engine, means for supplying combustible gas and compressed air, a casing having an annular chamber, one or more piston heads traveling therein and one or more pairs of coaxial rotating and oscillating valves operated by the engine for controlling the admission of combustible gas and compressed air to said chamber.

4. In a rotary engine, a casing having an annular chamber, a piston head traveling therein and coaxial rotating and oscillating valves for controlling the admission of combustible gas and compressed air to said chamber, the rotating valve being driven from the engine shaft and the oscillating valve being controlled in its movements by the piston head.

5. In a rotary engine, a casing having an annular chamber, one or more piston heads traveling therein, one or more pairs of separate combustible gas and compressed air inlet passages, and one or more pairs of coaxial rotating and oscillating valves for controlling the admission and exhaust of the combustible gas and compressed air.

6. In a rotary engine, a casing having an annular chamber, one or more piston heads traveling therein, one or more valve chests, each having inlet and exhaust chambers communicating with the piston chamber and coaxial valves coacting to admit the motive fluid to each inlet chamber and to open and close the inlet and exhaust chambers to the piston chamber.

7. In a rotary engine, a casing having an annular chamber, one or more piston heads traveling therein, one or more valve chests, each having inlet and exhaust chambers communicating with the piston chamber and coaxial rotating and oscillating valves coacting to admit the motive fluid to each inlet chamber and to open and close the inlet and exhaust chambers to the piston chamber.

8. In a rotary engine, a casing having an annular chamber, one or more piston heads traveling therein, one or more valve chests, each having inlet and exhaust chambers communicating with the piston chamber, separate combustible gas and compressed air inlet passages and coaxial valves coacting to admit the combustible gas and compressed air alterately to the inlet chamber and to open and close the inlet and exhaust chambers to the piston chamber.

9. In a rotary engine, a casing having an annular chamber, one or more piston heads traveling therein, one or more valve chests, each having inlet and exhaust chambers communicating with the piston chamber, separate combustible gas and compressed air inlet passages and coaxial rotating and oscillating valves coacting to admit the combustible gas and compressed air alternately to the inlet chamber and to open and close the inlet and exhaust chambers to the piston chamber.

10. In a rotary engine, a casing having an annular chamber, one or more piston heads traveling therein, one or more valve chests each having inlet and exhaust chambers communicating with the piston chamber, separate combustible gas and compressed air inlet passages, coaxial valves having separate ports arranged to alternately open said passages to the inlet chamber, said oscillating valve being also arranged to open and close said inlet and exhaust chambers to said piston chamber.

11. In a rotary engine, a casing having an annular chamber, one or more piston heads traveling therein, one or more valve chests each having inlet and exhaust chambers communicating with the piston chamber, separate combustible gas and compressed air inlet passages, coaxial rotating and oscillating valves having separate ports arranged to alternately open said passages to the inlet chamber, said oscillating valve being also arranged to open and close said inlet and exhaust chambers to said piston chamber.

12. In a rotary engine, a rotary piston comprising a hub member having spokes, and a rim member having recesses for receiving the ends of the spokes, and straps for holding said spokes in said recesses, said rim member having a piston head formed integral therewith.

13. In a rotary engine, a casing having an annular chamber, a piston traveling therein, a valve chest having inlet and exhaust chambers, an oscillating valve for opening and closing the inlet and exhaust chambers to the piston chamber, said valve having side plates fitted to slide in fitted guides in the side walls of the valve chest.

14. In a rotary engine, a casing having an annular piston chamber, a piston head traveling therein, a valve chest having inlet and exhaust chambers, a rotating tapered valve seated in the valve chest, means yieldingly holding said valve to its seat and an oscillating valve mounted on said tapered valve within the valve chest, said valves coacting to control the admission and exhaust of the motive fluid.

15. In a rotary engine, a rotary shaft, a piston thereon, an annular casing having a piston chamber concentric with said shaft, a jacket inclosing and spaced from said casing and having a central air intake and a peripheral air outlet, and a fan on said shaft for forcing the air through said jacket.

16. In a rotary engine, a rotary shaft, a piston thereon, an annular casing having a piston chamber concentric with said shaft, a jacket inclosing and spaced from said casing and having a central air intake and a peripheral air outlet, a fan on said shaft for forcing the air through said jacket and a damper for regulating the size of the air intake.

17. In a rotary engine, a rotary shaft, a piston thereon, an annular casing having a piston chamber concentric with said shaft, heat radiating flanges on said casing, a jacket inclosing and spaced from said casing and having a central air intake and a peripheral air outlet, and a fan on said shaft for forcing the air through said jacket.

18. In a rotary engine, a rotary shaft, a piston thereon, an annular casing having a piston chamber concentric with said shaft, heat radiating flanges on said casing, a jacket inclosing and spaced from said casing and having a central air intake and a peripheral air outlet, a fan on said shaft for forcing the air through said jacket and a damper for regulating the size of the air intake.

19. In a rotary engine, a rotary shaft, a piston thereon, an annular casing having a piston chamber concentric with said shaft, a valve chest formed integral with said casing, a jacket inclosing and spaced from said casing and valve chest and having a central air intake and a peripheral air outlet, and a fan on said shaft for forcing the air through said jacket.

20. In a rotary engine, a rotary shaft, a piston thereon, an annular casing having a piston chamber concentric with said shaft, a plurality of valve chests formed integral with said casing, a jacket inclosing and spaced from said casing and valve chests and having a central air intake and a peripheral air outlet, and a fan on said shaft for forcing the air through said jacket.

21. In a rotary engine, a rotary shaft, a piston thereon, an annular casing having a piston chamber concentric with said shaft, a valve chest formed integral with said casing, heat radiating flanges on said casing and valve chest, a jacket inclosing and spaced from said casing and valve chest and having a central air intake and a peripheral air outlet, and a fan on said shaft for forcing the air through said jacket.

22. In a rotary engine, a rotary shaft, a piston thereon, an annular casing having a piston chamber concentric with said shaft, a plurality of valve chests formed integral with said casing, heat radiating flanges on said casing and valve chests, a jacket inclosing and spaced from said casing and valve chests, and having a central air intake and a peripheral air outlet, and a fan on said shaft for forcing the air through said jacket.

23. In a rotary engine, an annular casing formed of two circular half sections having therein an annular piston chamber with a continuous groove through the inner wall, a plurality of valve chests composed of half sections formed integral with their respective casing half sections, and casing supporting brackets formed integral with their respective valve chest half sections.

In testimony that I claim the foregoing as my invention I have signed my name, this third day of March, 1919.

PHILIP D. HIBNER.